Aug. 9, 1966     T. E. WILKINSON     3,265,135
FISHING TOOL GUIDE
Filed July 11, 1963
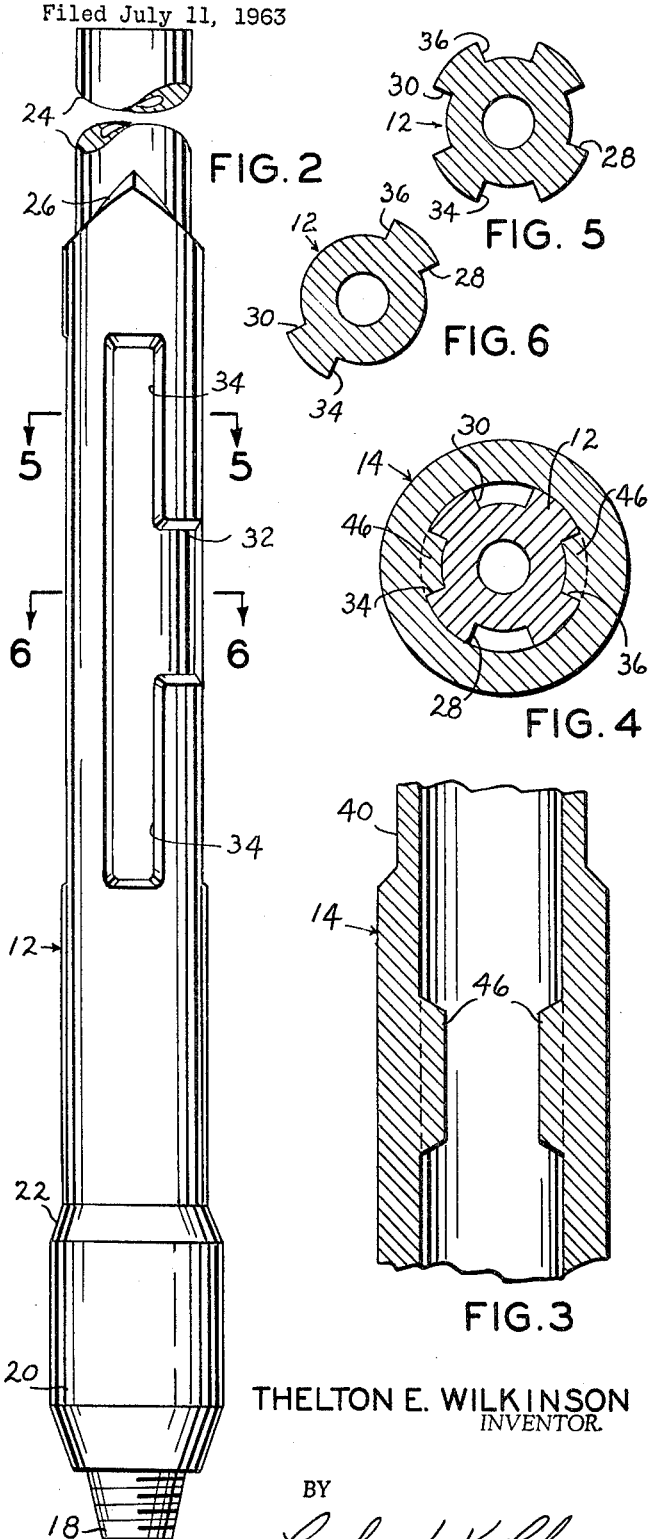
THELTON E. WILKINSON
INVENTOR.
BY Robert K. Rhea
AGENT

United States Patent Office 3,265,135
Patented August 9, 1966

3,265,135
FISHING TOOL GUIDE
Thelton E. Wilkinson, Hobbs, N. Mex.
(41 H.M.S. Courts, Houma, La.)
Filed July 11, 1963, Ser. No. 294,333
5 Claims. (Cl. 166—240)

The present invention relates to well drilling apparatus and more particularly to a device for guiding well tools toward engagement with a section of lost drill string, or the like, or other tubular apparatus commonly known as a "fish."

In the drilling of an oil well or during maintenance of a completed well it occasionally becomes necessary to fish out a lost portion of tubular equipment left in the borehole, such as a drill string or tubing. During such operations it is frequently necessary that the upper end portion of the fish be prepared or smoothed up for the reception of a suitable fishing tool. In some instances the upper end of the fish, such as tubing or casing, is inclined with respect to the vertical in the borehole so that a fishing tool tends to bypass the upper end of the fish without making proper contact with the latter to effect a connection. Under such conditions it is desirable to perform such operations as washing the lower end of a wash-string over the upper end of the fish by circulating a fluid through the wash pipe so that the lower end portion of the wash-string surrounds the fish to guide a fishing tool into contact with the fish.

It is, therefore, the principal object of the instant invention to provide a tool adapted to be connected to a drill string, or the like, and lowered into a borehole.

Another object is to provide a tool guide adapted to be run into a borehole on a pipe string so that an operator, controlling the fishing string, may ascertain when the fishing tools have encountered a fish.

Another object is to provide a tool of this class which may be connected with washover pipe, or the like, for surrounding the upper end portion of a fish within a borehole and wherein a milling tool or a fish retrieving tool, connected with the tool guide, will be directed into contact with the upper end of the fish within the wash pipe.

Still another object is to provide a tool of this class wherein the tool components are provided with releasable connecting means locking the components for rotation so that the wash pipe may be rotated by rotating the drill string and wherein the components of the tool may be separated for lowering and rotating an inner portion of the tool with respect to its outer portion.

The present invention accomplishes these and other objects by providing a mandrel adapted to be connected at one end with a drill string and connected at its other end with fish retrieving tools wherein the mandrel is surrounded by and releasably engageable with a sleeve member permitting downward movement of the mandrel through the sleeve.

Other objects will be apparent from the following description when taken in conjunction with the accompanying single sheet of drawings, wherein:

FIGURE 1 is a fragmentary vertical sectional view, partly in elevation, through the tool;

FIGURE 2 is a fragmentary elevational view of the tool mandrel, per se, rotated 90° from its position in FIG. 1;

FIGURE 3 is a fragmentary vertical cross-sectional view of the tool sleeve;

FIGURE 4 is a horizontal cross-sectional view taken substantially along the line 4—4 of FIG. 1; and, FIGURES 5 and 6 are horizontal cross-sectional views taken substantially along the lines 5—5 and 6—6 of FIG. 2.

Like characters of reference designate like parts in those figures of the drawings in which they occur.

In the drawings:

The reference numeral 10 indicates the tool, as a whole, comprising a tubular mandrel 12 and a body or sleeve 14. The mandrel 12 is internally threaded at its upper end portion, as at 16, for connection with the depending end of a drill string, or other tubular string, for lowering the tool into a well bore, neither of which are shown. Similarly the depending end of the mandrel is externally threaded, as at 18, for connection with suitable fish engaging or retrieving tools, not shown. Adjacent its threaded end 18, the mandrel is circumferentially enlarged, as at 20, to form a tapered seat 22 for the purposes more fully explained hereinbelow.

Adjacent its upper end the mandrel 12 is diametrically reduced, as at 24, forming a shoulder 26. The mandrel 12 is provided with two diametrically opposed H-shaped configurations or slots on its exterior surface, each having one "open" end and three "blind" ends. One leg slot 28 and 30, respectively, of each H-shaped configuration intersects and is open through the shoulder 26 at the reduced end portion 24 of the mandrel while the opposite or depending end portion of each leg slot 28 and 30 of the respective H-shaped configuration forms a blind end terminating intermediate the length of the mandrel. The other leg slot 34 and 36, respectively, of the H-shaped configurations each form a blind end circumferentially aligned with the depending blind end of the leg 28 and 30, respectively, while the opposite or upper blind end of each leg slot 34 and 36, respectively, terminate in circumferentially aligned relation and downwardly spaced relation with respect to the shoulder 26. The respective leg slots 28–34 and 30–36 are joined by lateral or horizontal connecting slots 32 to complete the H-shaped configurations. The depth of the H-shaped configurations or slots is substantially equal to the diametric difference between the outside diameter of the major portion of the mandrel and the outside diameter of its reduced upper end portion 24.

As shown in the drawings, the shoulder 26 is beveled downwardly, from diametrically opposite positions, toward the upwardly open end of the respective leg slot 28 and 30 for the purposes more fully explained hereinbelow.

The sleeve or body 14 is provided with a reduced upper end portion 40 so that the latter may be gripped by a fishing tool if lost in a well. The depending end portion of the sleeve 14 is externally threaded for connection with washover pipe 42, or the like. A tapered seat 44 is formed on the depending end of the sleeve for cooperative sealing engagement with the seat 22. The inside diameter of the sleeve 14 slidably receives that portion of the mandrel 12 above the mandrel seat 22. Intermediate its ends, the sleeve is provided with a pair of diametrically opposing detents or lugs 46, having upper and lower beveled surfaces, and which project inwardly of the bore of the sleeve a distance substantially equal to the depth of the respective H-shaped configurations so that the mandrel may be longitudinally inserted into the sleeve 14 by the open end portion of the leg slots 28 and 30 slidably receiving the lugs 46 and when the mandrel is axially rotated within the sleeve, to align the lugs 46 with the lateral slots 32, the lugs 46 will enter the respective blind end leg slots, 34 and 36. Thus it may be seen that the H-shaped configurations and lugs form a connecting and locking means for releasably joining the mandrel and sleeve.

*Operation*

In operation the sleeve is installed on the mandrel by inserting the mandrel into the sleeve from the bottom or depending end thereof so that the lugs 46 will enter the upwardly open end of the leg slots 28 and 30 as disclosed hereinabove. The mandrel is connected to the depending end of a tubular well string, not shown, and a desired fishing or milling tool is connected to the mandrel threads 18. A desired length of the wash pipe 42 is threadedly connected to the sleeve 14 and the assembly is lowered into the hole. While going into the hole the weight of the sleeve and wash pipe is supported by the sleeve seat 44 contacting the mandrel seat 22 and the lugs 46 are positioned within the blind slots 34 and 36, adjacent the lowermost end of the respective slot. When the fish is encoutered by the wash pipe 22, fluid is circulated through the well pipe string and through the mandrel so that the wash pipe may be washed over the fish in a conventional manner. In this position the sleeve seat 44 is in fluid tight sealing engagement with the mandrel beveled surface or seat 22. The tool 10 and its connected components may be rotated by rotating the pipe string. The wash pipe then serves as a guide for directing the mill or fish retrieving tools into contact with the upper end of the fish. The mandrel and mill may be rotated independently of the sleeve and wash pipe by placing a righthand torque on the mandrel and lowering the mandrel with respect to the sleeve until the lugs 46 enter and are rotated out of the blind end leg slots 34 and 36 through the lateral slots 32 which permits the lugs to enter the respective leg slots 28 and 30. The sleeve is then supported by the wash pipe 42 permitting the mandrel to be lowered through the sleeve 14 wherein the lugs 46 are released from the mandrel 12 by sliding through the upwardly open end of the leg slots 28 and 30. Thereafter the mandrel may be rotated by the pipe string for milling a fish or lowering the fish retrieving tool into gripping engagement with the fish. After performing the desired operation the mandrel is lifted into the sleeve where the beveled edges of the mandrel shoulder 26 guides the lugs 46 into the upwardly open end of the respective leg slots 28 and 30. Thereafter the tool and connected components may be withdrawn from the well or, if desired, the lugs 46 may be repositioned within the blind end leg slots 34 and 36 for further fishing operations.

Obviously the invention is susceptible to some change or alteration without defeating its practicability, and I therefore do not wish to be confined to the preferred embodiment shown in the drawings and described herein, further than I am limited by the scope of the appended claims.

I claim:
1. A well tool guide, comprising: a tubular mandrel having threaded upper and lower ends connectable to a tubular well string, said mandrel having an enlarged lower end portion forming a seat, said mandrel having a reduced upper end portion defined by an abrupt shoulder; two diametrically opposed H-shaped slots formed in the exterior surface of said mandrel, each said H-shaped slot having three blind ends and having one open end intersecting said shoulder; a sleeve slidably surrounding said mandrel and having a seat formed on its lower end portion sealing with the seat formed on the mandrel when the mandrel is moved upwardly with respect to said sleeve, said sleeve having a threaded lower end connectable with a tubular string; and diametrically opposed lugs formed on the inner periphery of said sleeve and releasably engageable with said H-shaped slots for imparting axial rotation to said sleeve when said mandrel is rotated and the release of said mandrel from engagement with said lugs whereby said mandrel may be moved downwardly through said sleeve and rotated independently of the latter.

2. A well tool guide, comprising: a vertically disposed elongated tubular body having exterior threads at its lower end for connection with a string of washover pipe; a seat formed on the lower end portion of said body; a mandrel slidably received by said body and projecting upwardly thereabove, said mandrel having an enlarged lower end portion forming a tapered surface sealing with said seat; coupling means at the lower end of said mandrel for attaching a tool thereto; coupling means at the upper end of said mandrel for attachment with the lower end of a fishing string; and means connecting said mandrel to said body for rotation therewith and longitudinal movement of the mandrel with respect to said body.

3. Structure as specified in claim 2 in which the connecting means includes: diametrically opposed longitudinal slots formed in the outer wall of said mandrel; and diametrically opposed detents formed on the inner periphery of said body and slidably positioned within the slots in the wall of said mandrel.

4. Structure as specified in claim 3 in which the mandrel is characterized by a reduced upper end portion diametrically substantially equal with respect to the diameter defined by the inward limit of said detents, said reduced upper end portion terminating in an abrupt shoulder positioned above the upper limit of said body and in which said slots open inwardly through said shoulder.

5. Structure as specified in claim 4 in which the slots comprise diametrically opposed H-shaped configurations each having three blind ends.

References Cited by the Examiner

UNITED STATES PATENTS

| | | | |
|---|---|---|---|
| 2,918,259 | 12/1959 | Le Bus | 166—237 X |
| 2,961,219 | 11/1960 | Le Bus | 175—321 |
| 3,082,831 | 3/1963 | Le Bus | 166—240 |
| 3,097,001 | 7/1963 | Le Bus | 285—361 |
| 3,102,594 | 9/1963 | Crowe | 166—125 |

CHARLES E. O'CONNELL, *Primary Examiner.*

D. H. BROWN, *Assistant Examiner.*